FIG. 1

James R. Ford
INVENTOR

ATTORNEY

Oct. 11, 1960  J. R. FORD  2,956,164
AIRBORNE SCINTILLATION COUNTER
Filed Sept. 4, 1956  6 Sheets-Sheet 2

James R. Ford
INVENTOR

BY *Forrest J. Lilly*

ATTORNEY

James R. Ford
INVENTOR

ATTORNEY

FIG. 3d

James R. Ford
INVENTOR

Oct. 11, 1960   J. R. FORD   2,956,164
AIRBORNE SCINTILLATION COUNTER
Filed Sept. 4, 1956   6 Sheets-Sheet 6

FIG. 3e

James R. Ford
INVENTOR

BY
ATTORNEY

United States Patent Office

2,956,164
Patented Oct. 11, 1960

2,956,164

AIRBORNE SCINTILLATION COUNTER

James R. Ford, West Covina, Calif., assignor to Hycon Mfg. Company, Pasadena, Calif., a corporation of Delaware Filed Sept. 4, 1956, Ser. No. 607,899

11 Claims. (Cl. 250—71.5)

This invention relates generally to scintillation counters and more particularly to an airborne scintillation counter.

The airborne scintillation counter is frequently used in searching for radioactive minerals such as uranium, thorium and potassium. Gamma radiation emitted by these minerals vary respectively in energy level for the different types and permit their identification through measurement of gamma radiation energies recorded by a scintillation counter in a survey.

The scintillation counter employs a crystal which scintillates in the presence of radiation. Thallium activated sodium iodide has a large gamma ray absorption coefficient and is commonly used in gamma radiation detection. The crystal scintillations or light flashes are directed into a shielded photomultiplier tube which converts the light flashes into electrical pulses that can be counted and recorded.

In aerial surveys, the number of counts detected by a scintillation counter over a given area is inversely proportional (although not linearly) to the altitude of the aircraft carrying the scintillation counter. This is essentially true in all practical surveys since gamma ray transmission decreases as the square of the altitude, while the area seen and therefore, the amount of radiation receivable at any instant, increases as the square of the altitude. These two effects effectively cancel each other. Therefore, atmospheric absorption is the major contributing factor that affects gamma ray strength measured in aerial surveys.

It is an object of this invention to provide an altitude compensated airborne scintillation counter in which the effective number of counts from any given area is accurately measured irrespective of the altitude of the aircraft carrying the scintillation counter over the area.

Another object of the invention is to provide a multiple channel airborne scintillation counter to measure gamma ray intensities and energies whereby identification of different radioactive minerals is readily possible.

A further object of the invention is to provide an airborne scintillation counter particularly suited for reliable and sensitive prospecting of radioactive mineral deposits from aircraft through aerial surveys of terrain.

A still further object of this invention is to provide a scintillation counter capable of measuring and recording residual or background radiation as well as the total counts of all detected radiation above a certain energy level.

Briefly, the foregoing and other objects are accomplished by providing a scintillation crystal for detecting radiation and converting the radiation into visual light which is, in turn, converted into electrical signals by a photomultiplier tube and further amplified by suitable amplifiers. The amplified signal is fed to, for example, four parallel networks including respective multivibrators which are set to four different firing levels (threshold's) of input signal. The outputs of adjacent multivibrators are connected together through separate R-C networks to standard pulse generators, each R-C network yielding a "fire" and a "negate" signal from the adjacent multivibrators. The standard pulse generators are progressively fired for increasing input pulse heights, only one standard pulse generator being fired corresponding to the input pulse height within certain voltage (energy) levels, the other standard pulse generators receiving a "negate" signal which overrides any "fire" signal present. The standard pulse put out by the fired generator is modified in height according to the output of an altimeter and the modified signals are counted and recorded in separate recorder channels connected with the respective standard pulse generators. The outputs of the first and last multivibrators can be selectively connected without modification to a metering circuit (including a recorder channel) to read and record total and residual counts, respectively.

The invention possesses other objects and features, some of which together with the foregoing, will be set forth in the following description of a preferred embodiment of the invention. The invention and advantages thereof will be more fully understood by reading the description with joint reference to the attached drawings, in which:

Figure 1:
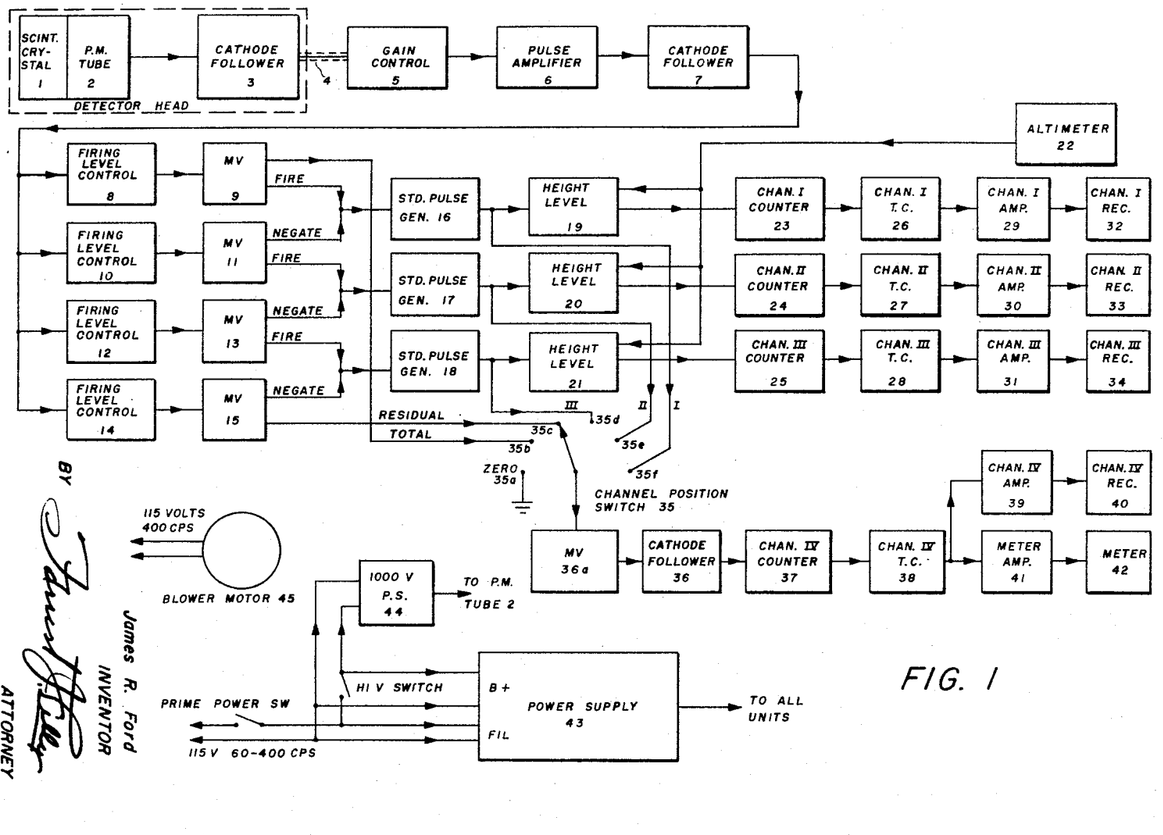
Figure 1 is a block diagram of a preferred embodiment of the invention.

A block diagram of a preferred embodiment of the airborne scintillation counter is shown in Figure 1. Gamma rays striking scintillation crystal 1 cause it to fluoresce, producing visual flashes of light that are directed to a photomultiplier tube 2. The crystal 1 is preferably a thallium activated sodium iodide crystal having a thin aluminum coating to shield it from alpha and beta radiations but which permits penetration by gamma rays to the crystal 1. A crystal suitable for aerial surveys can be approximately four inches in diameter and two inches thick. The base of the crystal 1 does not have an aluminum coating, and is placed and held in close contact with the window surface of the photomultiplier tube 2. A five inch photomultiplier tube 2 can be used with the four inch crystal, and silicon grease can be used to cement the base of the crystal 1 to the window surface of the photomultiplier tube 2. The silicone grease reduces the surface reflections at the contact surfaces.

The light flashes are converted into electrical pulses by the photomultiplier tube 2. Since brighter flashes of light are produced for higher energy levels of gamma radiation, correspondingly stronger electrical output pulses are produced from the photomultiplier tube 2 for the higher energy gamma rays. These electrical signals are fed to a cathode follower 3 which is provided to obtain a lower output impedance to match the impedance of connecting cable 4 such that the pulse shapes do not become distorted. The cable 4 connects the output of cathode follower 3 to a gain control unit 5 leading to pulse amplifier 6. The output of the pulse amplifier 6 is again connected to another cathode follower 7 to obtain a low output impedance. The pulses appearing on cable 4 vary between 0 to approximately 3 volts and are amplified to about 60 volts for the highest energy levels, corresponding to gamma ray energies of 3 m.e.v. sensed by the scintillation crystal 1.

The scintillation crystal 1, photomultiplier tube 2 and cathode follower 3 can all be contained in an aluminum case and comprise a detector head assembly. This unit is mounted firmly on shock mounts inside and near the skin of the aircraft with the face of the crystal parallel to the ground when in flight.

The output signal of cathode follower 7 is directed to four parallel branches of multivibrators set to respond to different levels of pulse heights. Firing level control unit 8 is adjusted so that only input pulses greater than a certain pulse height will fire multivibrator 9. This adjustment can be made for a pulse height of 8.6 volts, for example. Firing level control unit 10 is adjusted to a higher pulse height than would be necessary to fire multivibrator 11. Control unit 10 can be adjusted to permit firing of multivibrator 11 by input pulses having a pulse height of at least 28 volts, for example. Similarly, firing level control unit 12 can be adjusted to permit firing of multivibrator 13 by input pulses having a pulse height of at least 41 volts, and firing level control unit 14 can be adjusted to permit firing of multivibrator 15 by input pulses of pulse height of at least 60 volts, for example. Thus, multivibrator 9 is fired by pulses of at least 8.6 volts, multivibrators 9 and 11 are both fired by pulses of at least 28 volts, multivibrators 9, 11 and 13 are fired by pulses of at least 41 volts, and all four multivibrators 9, 11, 13 and 15 are fired by input pulses of at least 60 volts. Three channels are established with the above threshold settings, which channels allow discrimination of radiation emitted by radioactive uranium, thorium and potassium, for example.

The output of each multivibrator is mixed through an R–C network (not shown in block diagram) with adjacent multivibrators, and the mixed outputs are applied to control three standard pulse generators 16, 17 and 18. The R–C network is a negating circuit which produces signals that prevent the firing of a standard pulse generator when the negate signal is present. The standard pulse generators can also be multivibrators, which are fired when a fire signal is applied to the input of each multivibrator. A standard pulse generator will not be fired, however, when both fire and negate signals are applied to its input.

When the multivibrator 9 is fired, for example, the standard pulse generator 16 is subsequently fired because of the fire signal appearing on its input from the multivibrator 9. If a pulse from the detector head has a pulse height of 28 volts, for example, both multivibrators 9 and 11 will be fired such that the negate signal from multivibrator 11 when mixed with the fire signal from multivibrator 9 will override the firing of standard pulse generator 16. The standard pulse generator 17, however, will be fired because multivibrator 13 was not fired to produce a negate signal to counteract the fire signal from multivibrator 11. Similarly, multivibrators 9, 11 and 13 can be fired by an input pulse of the proper height and only standard pulse generator 18 will be fired because the other standard pulse generators have their fire signals counteracted by a negate signal. When all four multivibrators 9, 11, 13 and 15 are fired, none of the standard pulse generators 16, 17 and 18 will be fired.

The outputs of the standard pulse generators 16, 17 and 18 are respectively passed through three pulse height level control units 19, 20 and 21. The output of an altimeter 22 is applied to all three height level control units 19, 20 and 21 and causes the control units to vary the height of the standard pulses according to the altimeter output. The pulse height is increased for a higher altitude and reduced for a lower altitude.

The control units 19, 20 and 21 are respectively connected to three counters 23, 24 and 25. These counters are responsive actually to the height of the incoming standard generator pulse as well as the number of pulses. The counters produce a D.C. output, the level of which is proportional to the effective number of counts due to gamma radiation coming from the ground since the standard generator pulses have been modified to compensate for altitude.

The D.C. outputs of counters 23, 24 and 25 are respectively connected to three time constant control units 26, 27 and 28. These units 26, 27 and 28 are respectively connected, in turn, to three recording amplifiers 29, 30 and 31 that drive three respective recorder channels 32, 33 and 34. Channels 32, 33 and 34 are additionally labeled I, II and III, respectively, for easy functional reference throughout the system. The time constant control units 26, 27 and 28 include switching means for controlling the amount of capacitance connected across the input to the recording amplifiers 29, 30 and 31 and thus adjust the response time of the amplifying circuits. This permits a wide range of adjustment of sensitivity in recording by smoothing (integrating) out highly fluctuating readings over a given area.

When all four multivibrators 9, 11, 13 and 15 are fired, a fire signal appears on a line labeled "residual" and can be fed through channel position selector switch 35 to multivibrator 36a and then to cathode follower 36. The output of the multivibrator 36a provides uniform output pulses for all positions of switch 35 to cathode follower 36 connected to counter 37 which, in turn, is connected to time constant control unit 38. The output of the time constant control unit 38 is connected to amplifier 39 to drive recorder channel 40. Channel 40 is also labeled as channel IV for easy functional reference throughout the system. The output of the control unit 38 is also connected to meter amplifier 41 which drives meter 42.

Channel position selector switch 35 is preferably a six position, rotary selector switch. As shown in Figure 1, the first terminal 35a is connected to ground. Terminal 35b is connected to the output of multivibrator 9 and is labeled "total." The third terminal 35c is connected to the output of multivibrator 15 which was labeled "residual." The fourth, fifth and sixth terminals 35d, 35e and 35f are respectively connected to the outputs of standard pulse generators 16, 17 and 18. Thus, switch 35 can be operated to meter and record any of the outputs of the various channels I, II and III (32, 33 and 34) before any compensation for altitude. The first terminal 35a is labeled "zero" indicating that the inputs to amplifier 39 and meter amplifier 41 are essentially grounded, and recorder and meter zeroing can be accomplished in this position. When switch 35 is placed on "total," the meter circuit and recorder channel IV (40) are both connected to the output of multivibrator 9 which is fired by all input pulses (of at least 8.6 volts, for example) that are to be measured. On "residual" the meter circuit and recorder channel IV (40) are both connected to multivibrator 15 and measure the number of counts due to radiation energy levels greater than 3 m.e.v. (background radiations) which are principally due to cosmic rays. Similarly, when switch 35 is connected with terminals 35d, 35e and 35f, the number of counts for gamma energy levels corresponding respectively to detected potassium, thorium and uranium ore bodies (without altitude compensation) are metered and recorded.

A regulated power supply 43 provides D.C. power to all units, and a high voltage supply 44 provides the necessary high direct voltage of 1000 volts to the photomultiplier tube 2. These voltages can be derived, for example, from a standard 115 volts, 60 c.p.s. or 400 c.p.s. line. A blower motor 45 provides cooling air for the entire scintillation counter and requires 115 volt, 400 c.p.s. power, for example.

Figure 2:
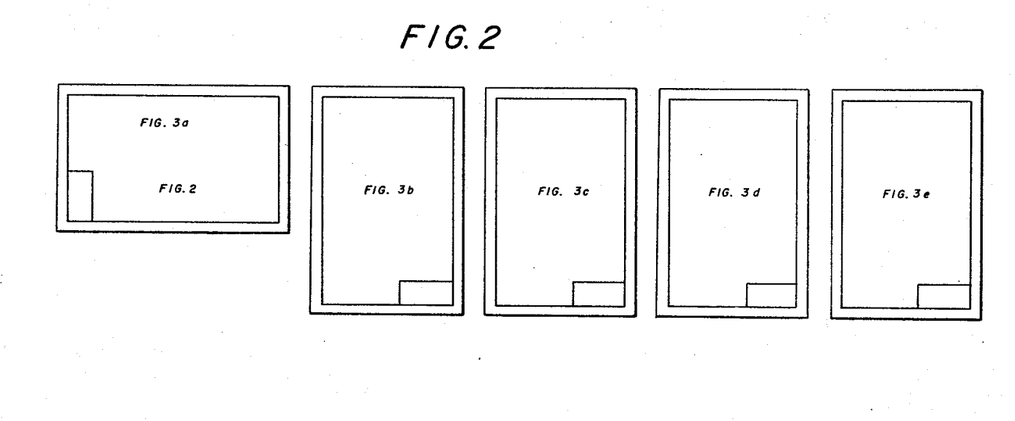
Figure 2 is a drawing indicating how the drawings of Figures 3a through 3e can be arranged to facilitate their viewing in entirety.
Figure 3A:
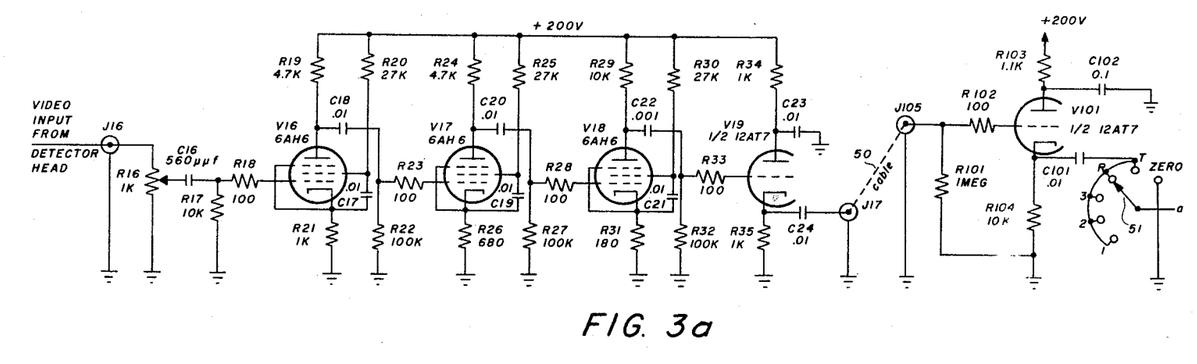
Figures 3a through 3e, together, comprise a detailed wiring diagram of the invention shown in Figure 1.
Figure 3B:
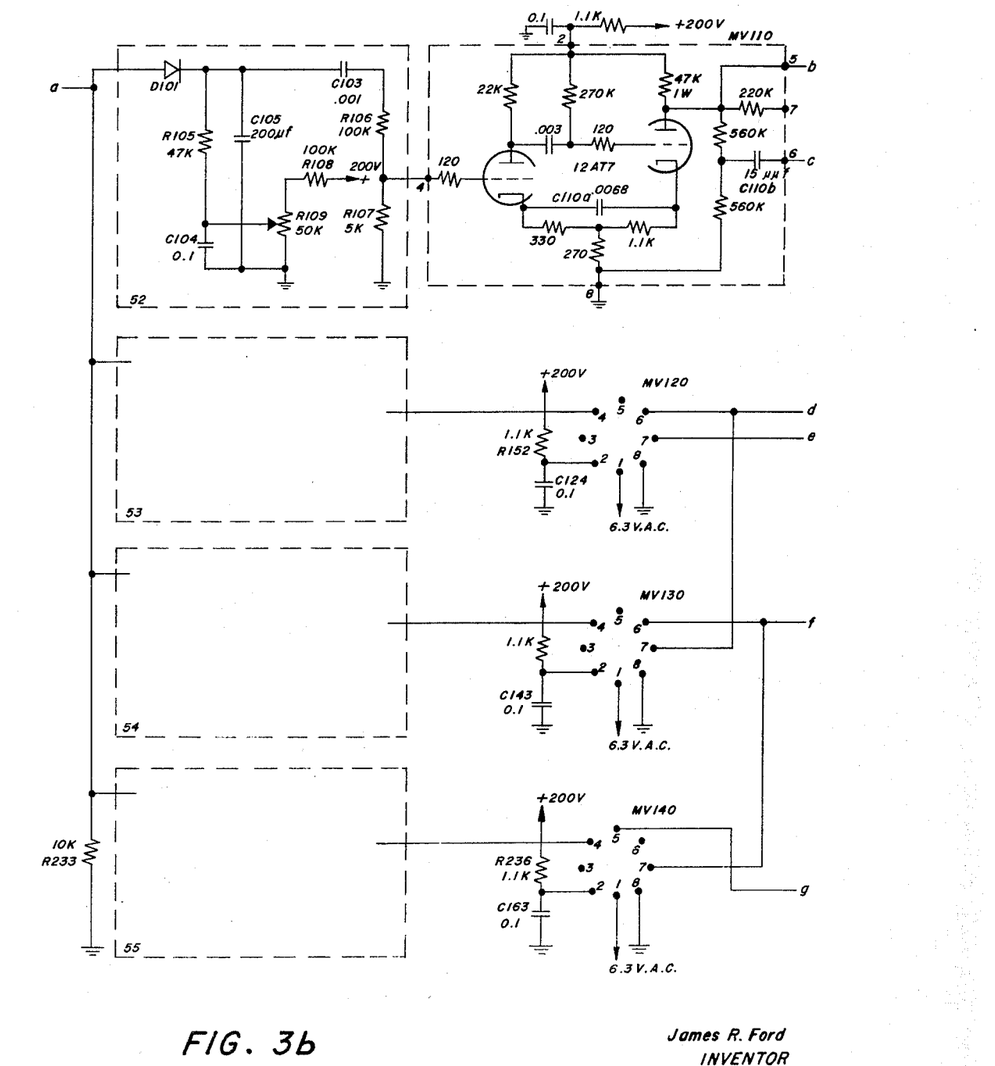
Figure 3C:
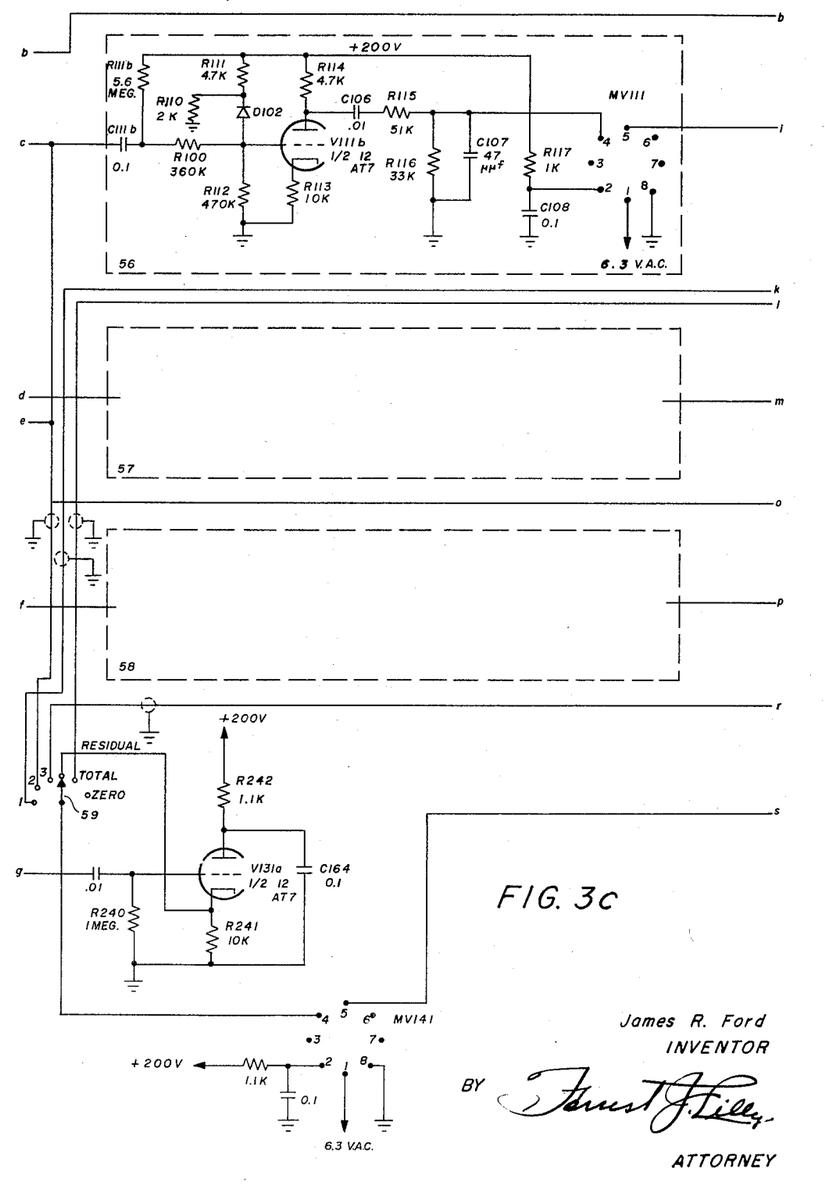
Figure 3D:
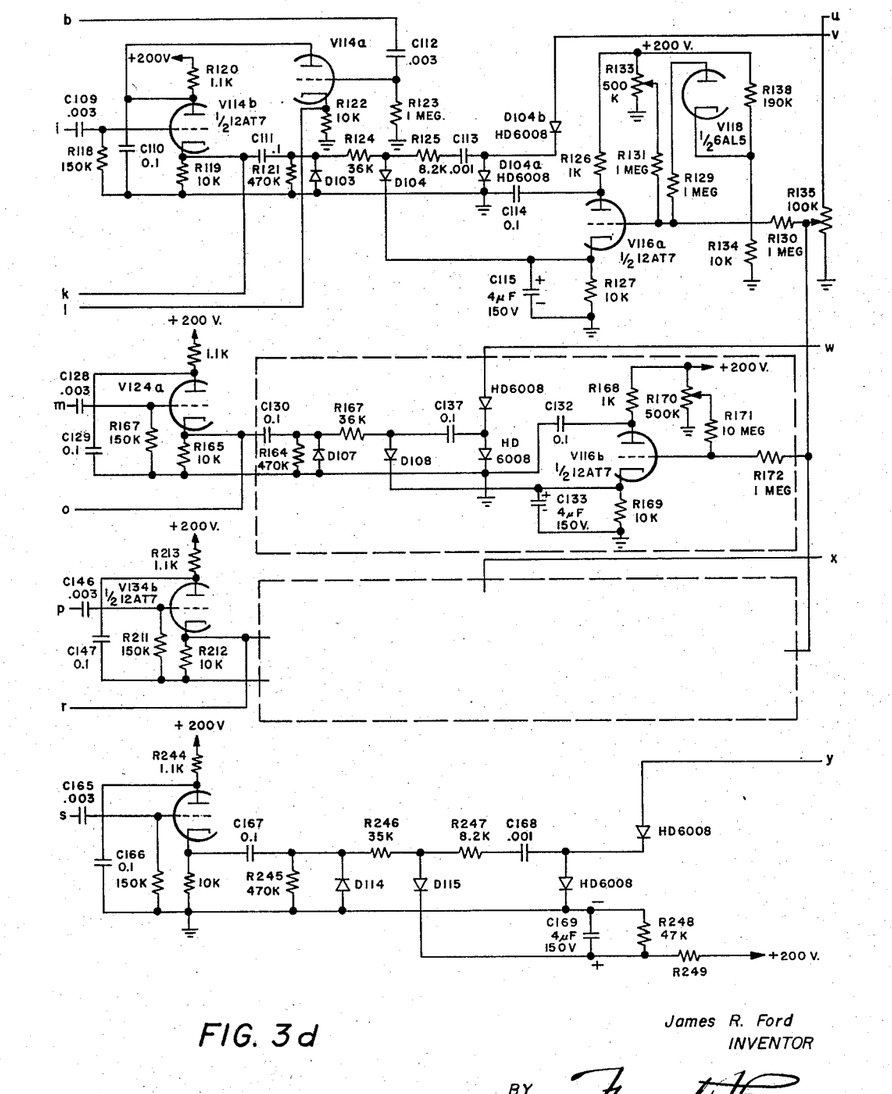
Figure 3E:
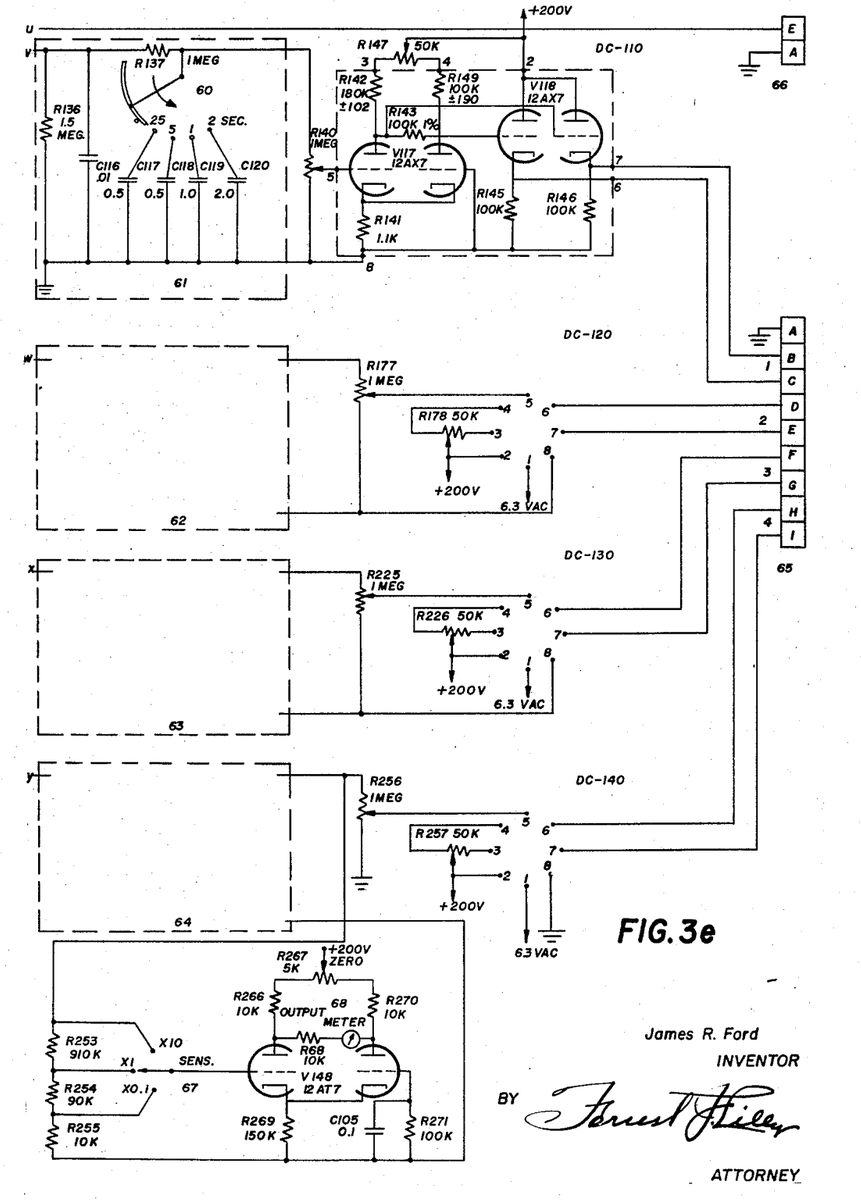

Figure 2 is a diagram illustrating the best arrangement of sheets for viewing all the drawings of Figures 3a through 3e. Figure 3e occupies the upper section of the sheet containing Figure 2 and Figures 3b, 3c, 3d and 3e can be placed adjacent to Figure 3a in consecutive order as shown.

Figures 3a through 3e are drawings which illustrate the detail wiring of a preferred embodiment of an airborne scintillation counter. The detector head assembly (see Figure 1) is omitted from the detailed drawings, however, since the assembly consists only of a few conventional items, and is believed adequately described above with reference to Figure 1. Similarly, details of the power supplies and blower motor are omitted from Figures 3a through 3e. Lower case letters are used to identify and connect leads broken by the division of drawings in these figures. Component values have been indicated on the drawings, but it should be understood that all specific values and data are given as examples only, and do not necessarily restrict or limit the scope of the invention. Resistances and capacitances are given in ohms and microfarads, respectively, unless otherwise noted.

The video input signal from the photomultiplier tube 2 and cathode follower 3 is applied across gain control potentiometer R16 (Figure 3a) through cable connector terminal J-16, connecting with connector cable 4. The output of potentiometer R16 is conventionally coupled through capacitor C16 to a three stage video amplifier including electron tubes V16, V17 and V18. These tubes are connected conventionally as resistance-capacitance coupled amplifier stages having inverse feedback to provide stability. The output of a cathode follower V19 is coupled through a capacitor C24 and connected by a cable 50 to another cathode follower V101. The output of the latter cathode follower V101 is coupled through capacitor C101 to a multiple position rotary switch 51. There are six position terminals on switch 51, five of which, labeled 1, 2, 3, R and T, are connected together and the last terminal labeled zero is grounded, as shown. The output of switch 51 is obtained on lead $a$, which is directly connected to the wiper of the switch 51. Switch 51 is ganged to switch 59 (Figure 3c).

The lead $a$ is connected to four parallel branches each including a firing level control unit and a multivibrator. Lead $a$ is connected to ground through resistor R233 and the output across R233 is connected to firing level control units 52, 53, 54 and 55. These units are respectively connected to multivibrators MV110, MV120, MV130 and MV140. The firing level control units are all alike, and all the multivibrators are also alike. For this reason, only one branch has been shown in detail in Figure 3b, the others being similar.

The lead $a$ is connected to diode D101, the output of which is applied to the multivibrator MV110 through coupling capacitor C103 and divider R106 and R107. The cathode of D101 is connected through resistor R105 to resistor R109 and is biased to a positive voltage set by adjusting resistor R109. The resistor R109 is connected to ground on one end and to plus 200 volts on the other end through resistor R108. Capacitor C104 is simply a bypass capacitor connecting the adjustable tap of R109 to ground. Capacitor C105 connecting the cathode of D101 to ground is a compensating capacitor which compensates for inherent shunting capacitance across diode D101. Thus, depending on the setting of R109, an input pulse on lead $a$ must be of at least a certain height to overcome the positive bias on the cathode of D101 in order to pass through to multivibrator MV110.

The output of voltage divider R106 and R107 is connected to trigger the multivibrator MV110, which is a conventional cathode-coupled, one-shot multivibrator producing an output pulse of established height and width for each input pulse. In Figure 3b, this output is obtained from the plate of the right tube in MV110 and is connected directly to pin 5, through a capacitance C110$b$ to pin 6 after dividing down the output, and through a resistance R110$b$ to pin 7. The signal appearing on pin 6 is a "fire" signal and that appearing on pin 7 is a "negate" signal. A small capacitor C110$a$ is connected between the cathodes of the two tubes of multivibrator MV110. This is not generally found in conventional multivibrator design but has been added to permit tube interchangeability without affecting the output pulse to any appreciable degree.

The other three channels are substantially identical. However, it is noted that pin 6 of multivibrator MV120 is connected to pin 7 of multivibrator MV130, and pin 6 of MV130 is connected to pin 7 of MV140. Pin 6 of MV110 is also connected to pin 7 of MV120 as can be seen from Figure 3c. The leads $b$, $c$, $d$, $e$, $f$ and $g$ match with the lead ends similarly labeled in Figure 3c. The leads $c$, $d$ and $f$ connect with three identical standard pulse generators 56, 57 and 58, which include negating circuits in the inputs.

The fire signal from MV110 appearing on lead $c$ is a differentiated signal comprising a positive and negative spike produced by the leading and trailing edges of the output pulse from MV110. This is combined with an integrated signal from MV120 appearing on lead $e$ and is the negate signal, when present. The combined signal is coupled to the control grid of tube V111$b$ through capacitor C111$b$ and resistor R100. The control grid of V111$b$ is connected to plus 200 volts through diode D102 in series with resistor R111. The common junction of R111 and D102 is connected to ground through resistor R110, as shown. The common junction of C111$b$ and R100 is also connected to plus 200 volts through a large resistor R111$b$. If the negate signal is not present, diode D102 is oriented to clip off most of the positive spike leaving essentially a negative spike which is inverted by tube V111$b$. The output is coupled through capacitor C102 and divided by resistors R115 and R116 and applied to trigger multivibrator MV111 producing a standard output pulse therefrom. Capacitor C107 is a small frequency compensating capacitance. When the negate signal is present, the wide, positive integrated signal overrides the negative spike such that only a positive signal remains and which is clipped by diode D102. Consequently, there is no positive pulse output from tube V111$b$ which can trigger multivibrator MV111. The pulse from the negating multivibrator must be wide enough to cover the firing pulse, otherwise the standard pulse generator will still fire. The same action can take place for generators 57 and 58, and standard output pulses are obtained on leads $i$, $m$ and $p$.

Lead $g$ is connected to cathode follower V131$a$, the output of which is connected to a terminal labeled "residual" of a six-position rotary switch 59. This switch 59 is ganged to switch 51 (Figure 3a). When switch 59 is placed in residual position, the output of multivibrator MV140 is connected through V131$a$ to trigger another multivibrator MV141 which connects with the metering (and recording) circuit. Switch 59 can be operated to terminals labeled 1, 2, 3, total and zero, as well, to meter the three different channels and the total count.

The lead $b$ is conventionally coupled to a cathode follower V114$a$ as shown in Figure 3d. The output is connected to the total labeled terminal of switch 59 through lead $l$. Thus, the output of multivibrator MV110 (Figure 3b) is made available to the metering circuit through the total position of switch 59. The lead $i$ is also conventionally coupled to a cathode follower V114$b$ and an output lead $k$ is similarly connected to terminal 1 of the switch 59 for metering purposes. Likewise, leads $m$ and $p$ are respectively connected to cathode followers V124$a$ and V134$a$ each having leads $o$ and $r$ connecting with terminals 2 and 3 of switch 59.

The output of cathode follower V114$b$ is coupled by capacitor C111 to resistor R121 which is grounded on the other end, and diode D103 is connected across resistor R121 to clamp the output at a particular level. Resistor R124 is connected to the cathode of D103. Resistor R125 is connected in series with R124 and capacitor C113 connected in series with R125. The other side of C113 is connected to a diode D104$a$ which is grounded on the other, cathode, end. Another diode D104$b$ is connected to the common junction of C113 and D104$a$, the other, anode, end being connected to lead $v$. Lead $u$, which carries the output signal from an altimeter, is connected to resistor R135 and thence to ground. An output is derived from the tap of R135 which is connected to the control grid of tube V116a through resistor R130. The anode of tube V116a is connected to plus 200 volts through load resistor R126 and the cathode is grounded through resistor R127 which is shunted by capacitor C115. The cathode of V116a is connected to the cathode of D104 and the anode is additionally connected to ground through bypass capacitor C114. The control grid of V116a is also connected to plus 200 volts through resistor R131 in series with adjustable resistor R133. The cathode of V118 is connected to voltage divider R134 and R138 and the anode of V118 is connected to the control grid of V116a through resistor R129.

The altimeter output is negative and increases for lower altitudes. Since the control grid of V116a is biased positively, conduction of V116a decreases for lower altitudes and increases for higher altitudes. This means that the cathode of D104 is correspondingly biased such that D104 conducts more readily for the lower altitudes and less readily for the higher altitudes. Thus, the pulse height appearing at C113 is reduced at the lower altitudes when more radiation is detected and increased for higher altitudes when less radiation is received and sensed. Diode V118 is introduced to provide for the non-linear function of radiation intensity versus altitude. V118 conducts when the grid of V116a is more positive than the cathode of V118. This provides operating slopes of altitude compensation which correct for the non-linear function.

The altitude compensating circuits are substantially identical in all channels except that a diode such as V118 is not necessary because the higher energy levels being measured in the other channels have a more linear relationship. The metering circuit does not employ either a tube as V116a or diode as V118 since altitude compensation is not utilized for this circuit. D115 produces a reference level and thereby a fixed amplified pulse for the metering circuit. R248 and R249 fix the bias to establish D115 clipping level. C169 provides a low impedance A.C. return path, for the diode D115.

The altitude compensating circuits are substantially identical in all channels except that a diode such as V118 is not necessary in the higher energy channels as previously stated.

Diodes D104a and D104b comprise the counter for the first channel. The capacitor C113 is charged such that the plate connecting with the cathode of D104b is negative and will therefore conduct through resistor R136 (Figure 3e) which connects with lead v. Capacitor C116 thus acquires a negative charge according to the conduction through diode D104b, which is dependent upon the magnitude of the compensated pulse appearing at C113 as well as the number of pulses occurring per second.

Capacitor C116 is connected to a switch 60 through resistor R137 and switch 60 can be operated to connect capacitors C117, C118, C119 and C120 progressively in parallel. Increasing the capacitance by connecting more capacitors in parallel increases the time constant of response. This is essentially an integrating network and smooths out highly variable input signals. Time constant circuit 61 is identical to circuits 62, 63 and 64 which are not detailed.

The outputs of the time constant circuits are connected to conventional D.C. amplifiers DC110, DC120, DC130 and DC140, having a push-pull type output. These outputs are connected to separate recorder 65 channels. Two twin Esterline Angus recorders having a 1 ma. full scale movement are found to be satisfactory for providing four recorder channels 1, 2, 3 and 4. Lead u is connected to the output of an altimeter 66 such as a type AN/APN–1 Radio Altimeter which measures absolute distance to the ground.

The output of time constant circuit 64 is additionally connected to three series resistors R253, R254 and R255. A three-position switch 67 connecting with different points of the resistor junctions provide a scale sensitivity adjustment for an output meter 68 driven by the push-pull type D.C. amplifier V148. The multiplication factors of ×10, ×1 and ×0.1 respectively yield a 5000 count, 500 count and 50 count reading for full scale deflection of meter 68.

When the channel position switch 59 is turned to total, the meter 68 should show, for instance, about 100 counts when the scintillation counter is on the ground in a normal, i.e., unradioactive, area, and about 50 counts from an altitude of 200 feet in the air over a normal area.

The three recording channels 1, 2 and 3 will receive counts diminishing in that order for any particular altitude since the abundance of radioactive uranium ore is proportionately greater than radioactive thorium ore which is, in turn, proportionately greater than radioactive potassium ore in normal deposits. Full scale setting for channel 1 can normally be adjusted to correspond to the equivalent count of 250 counts from the ground, channel 2 for 100 counts full scale, and channel 3 of 50 counts full scale.

By having a multiple channel scintillation counter in which each channel records only a certain range of radiation energies, it is possible to apply altitude compensation to each channel in the so-called trapezoidal correction manner. Thus, the altitude compensation reference setting can be adjusted to the median point with each channel energy range, and compensation is applied in both directions from a central reference altitude point. This produces a highly effective and accurate correction for altitude. The effective counts recorded with the present invention does not vary more than a few counts for any altitude from 0 to nearly 400 feet, over a given area.

From the above description, it will be apparent that there is thus provided a device of the character described possessing the particular features of advantage before enumerated as desirable, but which obviously is susceptible of modification in its form, proportions, detail construction and arrangement of parts without departing from the principles involved or sacrificing any of its advantages.

In order to comply with the statute, the invention has been described in language more or less specific as to structural features. It is to be understood, however, that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A scintillation counter, comprising: a detector unit for sensing radiation and converting the radiation into electrical signals; means for amplifying the electrical signals; at least two one-shot multivibrators; at least two firing level control means connected to receive the amplified electrical signals for respectively triggering said one-shot multivibrators, said control means adjusted to trigger said respective one-shot multivibrators at different electrical signal levels; a pulse generator; a network connecting the output of two of said one-shot multivibrators to the input of said pulse generator for producing a fire signal from one one-shot multivibrator and a negate signal from the other, said pulse generator being triggered when only the one-shot multivibrator producing the fire signal is triggered; and means for measuring the output of said pulse generator.

2. Apparatus in accordance with claim 1 including, in addition, means connected to meter the outputs from said one-shot multivibrators.

3. Apparatus in accordance with claim 1 wherein said network includes an R–C network for producing a differentiated fire signal and an integrated negate signal from respective outputs of said one-shot multivibrators.

4. Apparatus in accordance with claim 1 wherein said pulse generator includes a one-shot multivibrator.

5. Apparatus in accordance with claim 1 wherein said measuring means includes a counter connected to the output of said pulse generator, recorder amplifying means connected to amplify the output of said counter, and a recorder driven by said recorder amplifying means.

6. Apparatus in accordance with claim 5 including, in addition, a time constant circuit connecting said counter and said recorder amplifying means, for smoothing out rapid signal variations.

7. Apparatus in accordance with claim 6 wherein said time constant circuit includes an R–C integrating network.

8. A scintillation counter, comprising: a detector unit for sensing radiation and converting the radiation into electrical signals; means for amplifying the electrical signals; at least two one-shot multivibrators; at least two firing level control means connected to receive the amplified electrical signals for respectively triggering said one-shot multivibrators, said control means adjusted to trigger said respective one-shot multivibrators at different electrical signal levels; a pulse generator; a network connecting the output of two of said one-shot multivibrators to the input of said pulse generator for producing a fire signal from one one-shot multivibrator and a negate signal from the other, said pulse generator being triggered when only the one-shot multivibrator producing the fire signal is triggered; means for measuring the output of said pulse generator; a height level control unit connecting the output of said pulse generator to said measuring means; and an altimeter having an output signal responsive to altitude and applied to said height level control unit for varying the height of the output signal from said pulse generator according to the altimeter output.

9. An airborne scintillation counter for accurately measuring the intensity of gamma radiation from the earth in an aircraft during flight over the earth's surface, comprising: means for sensing radiation and producing an output signal therefrom; a plurality of discriminators connected to receive the output signal, said discriminators becoming respectively responsive at different levels of the output signal to produce respective output signals; a plurality of signal generators connected respectively to said discriminators, said signal generators being operatively responsive to the respective output signals from said discriminators to generate new output signals; a plurality of height level control units connected respectively to said signal generators; altimeter means providing a control signal to said height level control units for varying the height level of the new output signals from said signal generators according to aircraft altitude; and means connected to said height level control units for measuring the output signals therefrom, whereby energy characteristics of the sensed radiation are measured and identification of various radioactive minerals producing such sensed radiation is obtained.

10. A multiple channel scintillation counter including altitude compensation of each channel, comprising: means for sensing radiation and producing an output signal therefrom; a plurality of discriminator channels each responsive to different levels of the output signal for producing respective channel output signals; an altimeter for providing a control signal characteristically varying in accordance with altitude of an aircraft mounting said scintillation counter; a plurality of control means connected respectively to said discriminator channels and responsive to said altimeter control signal for varying magnitude of the channel output signals according to the altitude of the aircraft; means responsive to the control signal for varying operating amplification slope of each of said control means according to the altitude of the aircraft, to further vary the magnitude of the respective channel output signals whereby compensation for non-linear variation of radiation intensity with altitude is provided; and indicating means connected respectively to said control means.

11. An airborne scintillation counter for accurately measuring the intensity of gamma radiation from the earth in an aircraft during flight over the earth's surface, comprising: means for sensing radiation and producing an output signal therefrom; a plurality of discriminators connected to receive the output signal, said discriminators becoming respectively responsive at different levels of the output signal to produce respective output signals; a plurality of signal generators connected respectively to said discriminators, said signal generators being operatively responsive to the respective output signals from said discriminators to generate new output signals; a plurality of height level control units connected respectively to said signal generators; altimeter means providing a control signal to said height level control units for varying the height level of the new output signals from said signal generators according to aircraft altitude; means responsive to the control signal for varying operating amplification slope of said height level control units according to aircraft altitude, to further vary the height level of the new output signals whereby compensation for non-linear variation of radiation intensity with altitude is provided; and means connected to said height level control units for measuring the output signals therefrom, whereby energy characteristics of the sensed radiation are measured and identification of various radioactive minerals producing such sensed radiation is obtained.

References Cited in the file of this patent

UNITED STATES PATENTS

| | | |
|---|---|---|
| 2,617,945 | Lord et al. | Nov. 11, 1952 |
| 2,686,266 | Pringle et al. | Aug. 10, 1954 |
| 2,716,523 | Driver | Aug. 30, 1955 |
| 2,778,947 | Scherbatskoy | Jan. 22, 1957 |
| 2,830,185 | Scherbatskoy | Apr. 8, 1958 |

OTHER REFERENCES

Aerial Prospecting With Scintillation Counter, by Cowper, in Nucleonics, vol. 12, No. 3, March 1954; pages 29 to 35.